M. DERIHON.
SHOCK ABSORBER FOR VEHICLES.
APPLICATION FILED AUG. 8, 1912.
1,068,329.
Patented July 22, 1913.
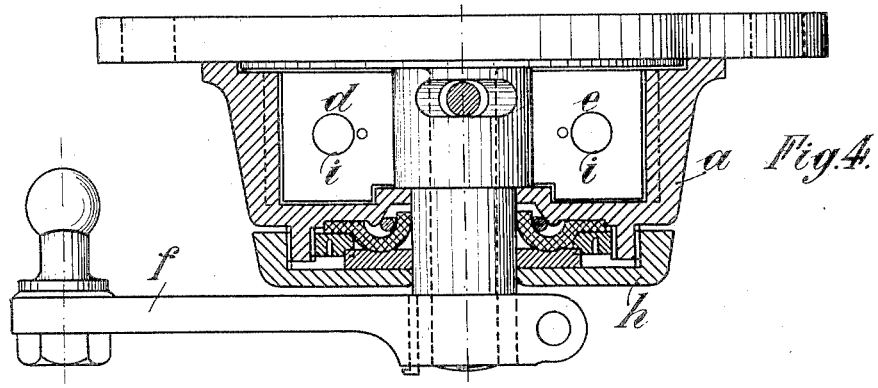
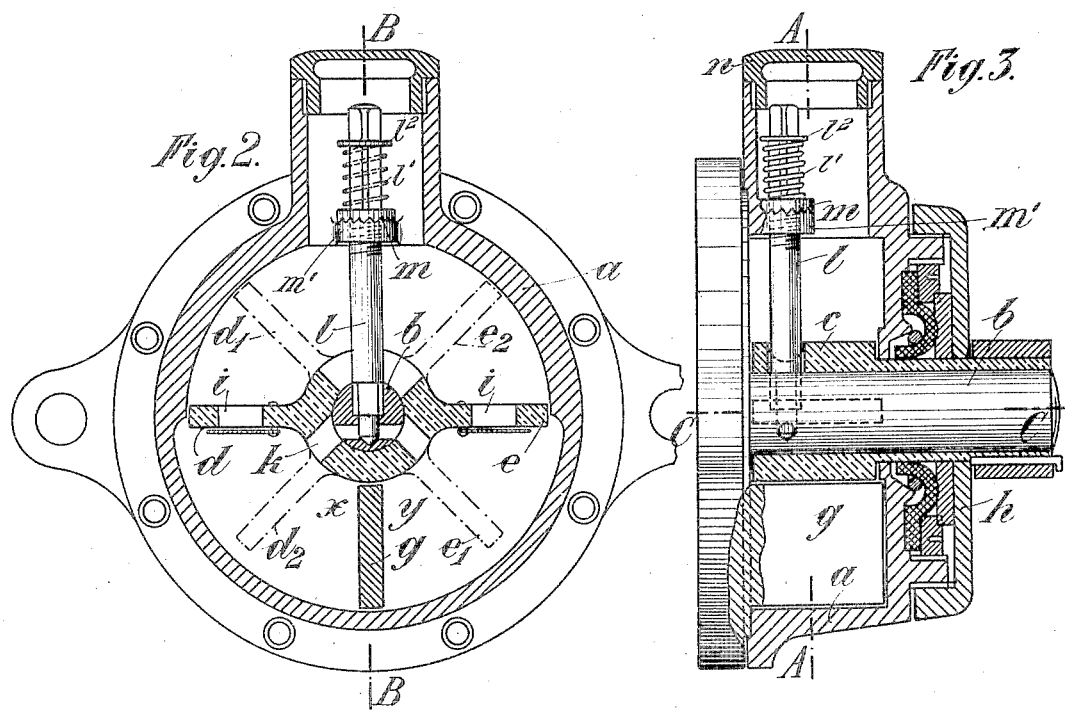
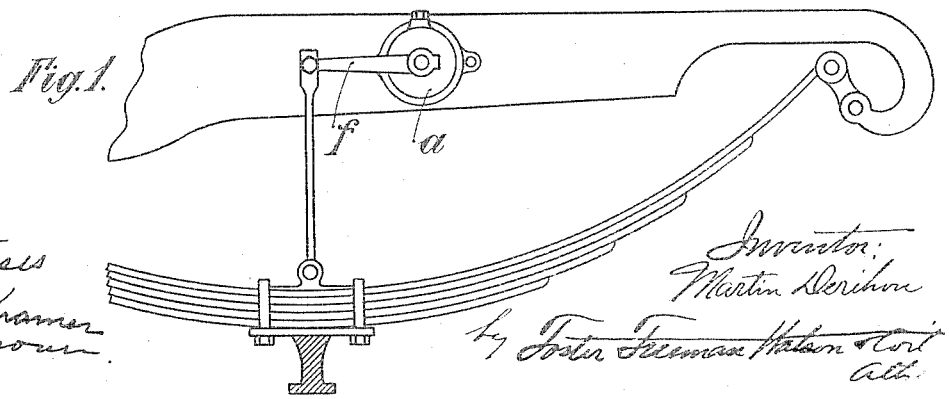

UNITED STATES PATENT OFFICE.

MARTIN DERIHON, OF LONCIN-LEZ-LIEGE, BELGIUM.

SHOCK-ABSORBER FOR VEHICLES.

1,068,329.

Specification of Letters Patent.

Patented July 22, 1913.

Application filed August 8, 1912. Serial No. 714,071.

*To all whom it may concern:*

Be it known that I, MARTIN DERIHON, subject of the King of Belgium, residing at Loncin-lez-Liege, Belgium, have invented certain new and useful Improvements in Shock-Absorbers for Vehicles, of which the following is a specification.

The present invention has for its object to provide an improved shock absorber for motor-cars and other suspended vehicles, so as to allow the suspension springs to be freely compressed or deflected, but retard the return movement which follows this compression or deflection of the spring. This retarding effect is, according to the present invention, of a constant value in both directions, whatever may be the amplitudes of vibration of the suspension springs. This result is obtained by means of a device which is arranged, so as to have no effect on the resilient deflection of the spring, that is to say, on the relative displacements which take place between the spring and the vehicle frame in both directions away from the neutral position, but to restrain the rapidity of the return movements toward the relative neutral position of the frame and spring with a constant resistance, that is to say, whatever may be the position of the piston of the device.

The accompanying drawings represent a shock absorber constructed according to this principle.

Figure 1 shows the shock absorber applied to a vehicle. Fig. 2 represents, upon an enlarged scale, a vertical section through A—A, Fig. 3. Fig. 3 is a vertical transverse section through B—B, Fig. 2. Fig. 4 is a transverse horizontal section through C—C, Fig. 3.

The apparatus consists of a cylinder $a$, fixed to the vehicle, and filled with oil, and in which oscillates, about the axle $b$, a shaft $c$, carrying the blades $d$ and $e$ and operated by a crank $f$, whose extremity is attached to the axle through the medium of a ball-jointed connecting rod. Each of the blades $d$ and $e$ carries a valve $i$ which may be opened from the top toward the bottom. The movements of the axle with respect to the frame cause the lever $f$ to oscillate and consequently cause an oscillation of the blades $d$ and $e$. In the cylinder $a$ and between the blades $d$ and $e$, is a partition $g$, which prevents the oil contained in the chamber $x$ from passing into the chamber $y$, and vice versa. A stuffing-box $h$ surrounds the shaft $c$ and prevents the oil from escaping.

When the vehicle is at rest, and the springs are normally loaded, the blades $d$ and $e$ occupy the horizontal position as shown in Fig. 1. If, when the vehicle is running, the springs are deflected owing to the inequalities of the ground, the blades will move into the oblique position $d^1$, $e^1$. In this position the blade $e$ is close to the partition $g$, whereas the blade $d$ has moved farther away from same. As the cylinder $a$ is bored so that the lower half of the circumference is of an internal radius greater than the upper half of the circumference, the blade $d$ constitutes a piston in the cylinder $a$, while the blade $e$ is completely out of engagement with the walls of the cylinder. The result is that the blade $e$ is free to move in the oil, while the movement of the blade $d$ opens the valve $i$, which thus allows the oil to pass from the top to the underside of the said blade. In this manner the spring is freely deflected and the crank is moved upward. In returning, that is to say, when the parts are moved back by the spring into their normal position, as above described, the crank $f$ moves downward, and the blades $d$ and $e$ return to their horizontal position. During this movement, the blade $e$ is again moved freely in the oil chamber, while the blade $d$, which acts as a piston, compresses the oil contained in the compartment $x$, as the valve $i$ is closed, and the partition $g$ prevents the oil from passing into the compartment $y$. In order to permit of this passage of the oil from one chamber to the other under the desired conditions a passage or opening $k$ is formed in the hub $c$ and the axle $b$ which establishes the desired communication, and whose size can be regulated by means of a screw $l$. By reducing the size of the opening, a greater resistance is offered to the passage of the oil from the compartment $x$ into the compartment $y$, which consequently retards the return of the spring.

The above-described function, which takes place on the compression or downward deflection of the ends of the spring (which is free to move in the one direction but retarded on the return), also takes place, under the same conditions, when the spring is deflected in the opposite direction with respect to its neutral position. When this happens the crank $f$ is lowered, and the blades $d$ and $e$ take the position $d^2$ and $e^2$, so that the blade $d$ performs the function of the blade $e$, and, inversely, the function of the blade $e$ is that of the said blade $d$ in the preceding case. The oil then passes from the chamber $y$ into the chamber $x$, passing through the passage $k$.

The regulating screw $l$ of the passage $k$ is preferably entirely inclosed by the casing of the cylinder $a$, with the object of preventing escape of oil; it is maintained in the position in which it is adjusted by means of a toothed clutch comprising a lug $m^1$ that projects inwardly from a wall of the casing and is provided with an interiorly threaded passage through which the screw $l$ extends, and a movable member $m$ which is adapted to move longitudinally of the screw but rotates therewith. The movable member of the clutch is constantly forced toward engaging position by a coil spring $l^1$ arranged about the screw between said clutch and a head $l^2$. A plug $n$ allows of the introduction of the oil and gives access to the screw $l$. It follows that the clamping or cushioning effect is the same for large or small oscillations, whatever may be the position of the blades, and that the said cushioning effect only depends upon the opening or orifice of the passage $k$.

Having fully described my invention, what I desire to claim and secure by Letters Patent is:—

1. A shock absorber for vehicles comprising, in combination with the vehicle springs, a cylinder adapted to contain oil, a fixed partition in the cylinder having a transverse passage between its sides, a piston in the cylinder, adapted to be connected with the axle of the vehicle, and valves carried by the piston, and so related thereto that the piston is adapted to move freely in the cylinder in both directions so as to allow of the resilient deflection, and contraction and expansion of the spring in both directions away from its normal position, but is opposed by a constant resistance during return movements in both directions toward the said normal position.

2. A shock absorber for vehicles comprising, in combination with the vehicle springs, a cylinder containing oil, a fixed partition therein having a passage between its opposite sides, two blades movable in the cylinder relatively to the fixed partition, and valves carried by the blades, one or other of said valves opening according to the direction of movement of the blades from the normal position, and the part of the cylinder comprised between the two blades and the fixed partition being of a greater diameter than that of the circle described by the ends of the blades, so that the one blade can move in the larger part of the cylinder without meeting with any resistance, while the other blade moves within the part of the cylinder which is of the same radius as the blades and acts as a piston.

3. The combination with a vehicle spring and frame, of a shock absorber comprising a casing secured to the vehicle frame and adapted to contain oil, a piston rotatably mounted in the casing and provided with two radially projecting blades each having a valved passage formed therethrough, means connecting the piston and vehicle spring, a relatively fixed partition secured in the casing between the piston blades, and means for permitting oil to flow from one of the spaces formed between said partition and the piston blades to the other, the valves in the piston being arranged to close corresponding ends of the passages through the blades, whereby the spring is adapted to contract or expand freely from its normal position and will be opposed by a constant resistance when returning to such normal position in either direction.

4. The combination with a vehicle spring and frame, of a shock absorber comprising a casing adapted to contain oil, an apertured piston rotatably mounted in the casing, one of said elements being adapted to be connected with the vehicle frame and the other with the spring, said parts being relatively movable, and valves compelling the passage of oil through the apertures in the piston in such manner that the spring is adapted to contract or expand freely from its normal position and will be uniformly checked in returning to normal position in either direction.

5. The combination with a vehicle spring and frame, of a shock absorber comprising a casing secured to the vehicle frame and adapted to contain oil, a piston rotatably mounted in the casing and provided with two diametrically opposite radially projecting blades each having a passage $i$ therethrough, a relatively stationary partition $g$ arranged in the casing, valves in the piston blades adapted to prevent oil from flowing through either passage $i$ when the blade in which said passage is formed is moving toward the partition $g$, adjustable means controlling the movement of oil from one side of the partition $g$ to the other, and means connecting the piston with the vehicle spring.

In testimony whereof I have hereunto set my hand in presence of two subscribing witnesses.

MARTIN DERIHON.

Witnesses:
A. P. CRUGER,
J. BOUTAY.